United States Patent
Labaar

[19]

[11] Patent Number: 6,133,993
[45] Date of Patent: *Oct. 17, 2000

[54] LENGTH AND VELOCITY MEASUREMENT APPARATUS

[75] Inventor: Frederik Labaar, Long Beach, Calif.

[73] Assignee: TRW Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/013,249

[22] Filed: Jan. 26, 1998

[51] Int. Cl.[7] ................................ G01C 3/08; B01P 3/36
[52] U.S. Cl. ................ 356/5.09; 356/4.09; 356/5.1; 356/28.5
[58] Field of Search .............. 356/28, 28.5, 5.1, 356/5.09, 4.09

[56] References Cited

U.S. PATENT DOCUMENTS

| | | |
|---|---|---|
| 3,094,693 | 6/1963 | Taylor . |
| 3,113,309 | 12/1963 | Kuecken . |
| 3,152,326 | 10/1964 | Merlo . |
| 3,730,628 | 5/1973 | Wolcott et al. ............... 356/5.11 |
| 4,902,125 | 2/1990 | Keene et al. . |

*Primary Examiner*—Stephen C. Buczinsky
*Attorney, Agent, or Firm*—Michael S. Yatsko

[57] ABSTRACT

A length and velocity measurement apparatus based upon an interference pattern created between the amplitude modulation component of a transmitted signal, generated by an RF/microwave modulated continuous wave (CW) laser, and the amplitude modulation component of a signal reflected back from the target. The distance between the system and the target is measured by counting the periods in the interference pattern created between the amplitude modulation component of the transmitted signal and the amplitude modulation component of the reflected signal while the modulation frequency is swept from a frequency $F_1$ to a frequency $F_2$. In order to provide a fine adjustment of the apparatus, the apparatus may be mounted on a movable carriage to adjust the periods in the interference pattern to an integral number. Velocity measurements are made at a single frequency based upon the Doppler effect induced by the moving target.

13 Claims, 2 Drawing Sheets

LENGTH AND VELOCITY MEASUREMENT APPARATUS

BACKGROUND OF THE INVENTION

1. Field of the Invention

The present invention relates to a length and velocity measurement apparatus and more particularly, to a length and velocity measurement apparatus which includes an RF modulated continuous wave (CW) laser in which the distance between the measurement apparatus and a target is measured by counting the periods in an interference pattern created between the amplitude modulation components of respectively the transmitted and reflected signals while the modulation signal is swept from a frequency $F_1$ to a frequency $F_2$. The velocity measurements are made at a constant RF modulation frequency, the periodic interference pattern is then induced by the moving target (Doppler effect).

2. Description of the Prior Art

Various apparatus are known for measuring the distance and speed of various objects. Both radio detection and ranging (RADAR) and sound navigation and ranging (SONAR) measurement apparatus are known. Portable radar systems are known to be used for detection and location of relatively large to very large objects at moderate to large distances. Such portable radar systems use a short wavelength in order to use a small antenna. The ability of a radar system to distinguish between neighboring objects is determined by the beam-width of the emitted RF/microwave signal. The beamwidth of the system is determined by the antenna size. In particular, the beamwidth is $\approx \lambda/D$ where $\lambda$=wavelength and D=the diameter in the major axis in the antenna aperture. Unfortunately, many portable radar systems, such as police radar systems, have problems with false readings due to the wide beamwidth or sidelobes that illuminate a number of unwanted targets.

SUMMARY OF THE INVENTION

It is an object of the present invention to solve various problems in the prior art.

It is yet another object of the present invention to provide an apparatus for measuring the distance and velocity of a target with a relatively small antenna which minimizes false readings.

It is yet a further object of the present invention to provide a system for measuring the length and velocity of a target that is suited for portable use which also minimizes false readings.

Briefly, the present invention relates to a length and velocity measurement apparatus based upon an interference pattern created between a sample of the RF amplitude modulation signal that is applied to the laser, and the detected RF amplitude modulation of the optical signal back reflected from a target. The distance between the system and the target is measured by counting the periods in the interference pattern created between the transmitted signal and the reflected signal while the modulation frequency is swept from a frequency $F_1$ to a frequency $F_2$. In order to provide a fine adjustment of the apparatus, the apparatus may be mounted on a movable carriage to adjust the periods in the interference pattern to an integral number. Velocity measurements are made at a single frequency based upon the Doppler effect of the moving target.

DESCRIPTION OF THE DRAWINGS

These and other objects of the present invention will be readily understood with reference to the following specification and attached drawing wherein.

DETAILED DESCRIPTION

Figure 1:
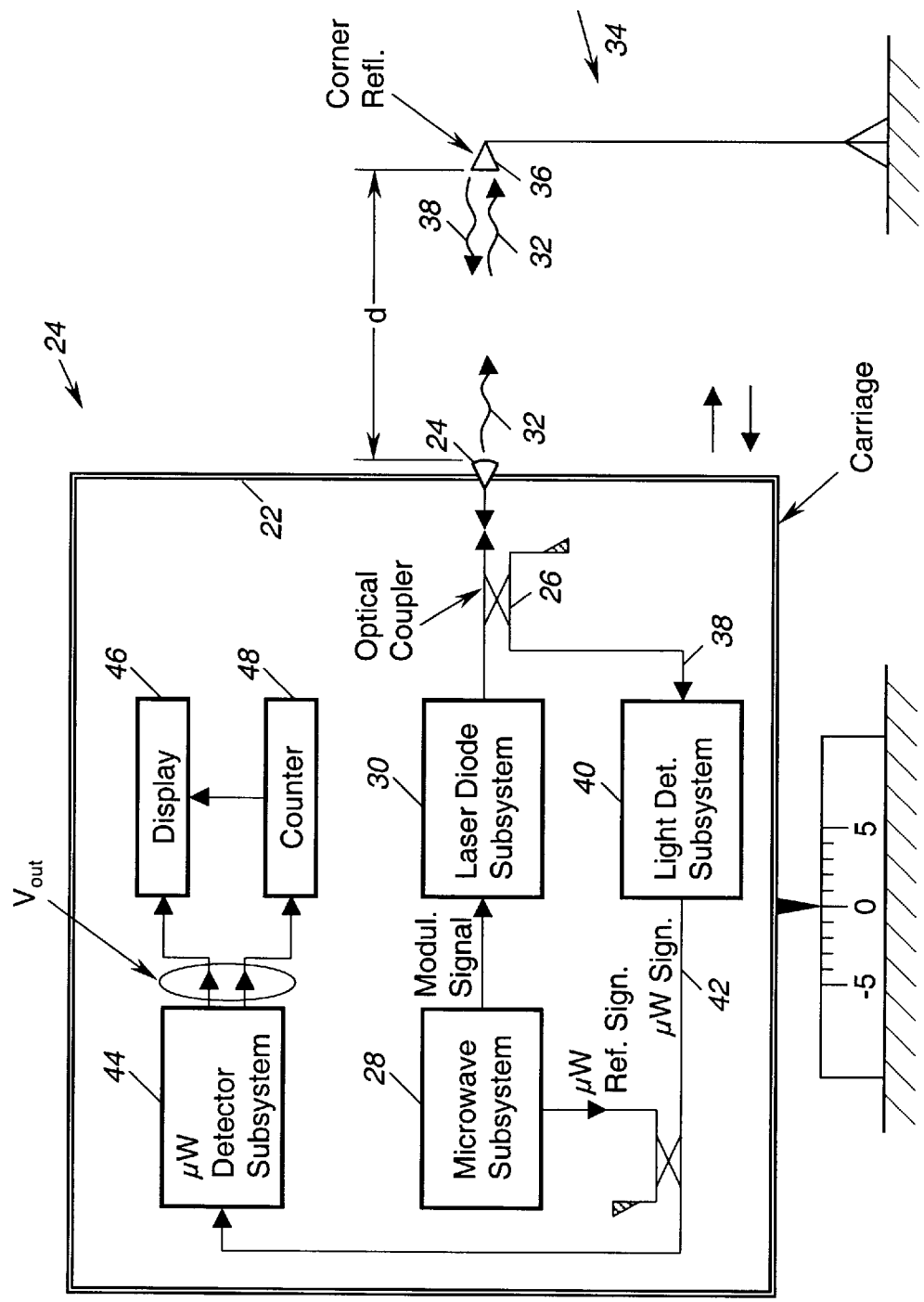
FIG. 1 is a block diagram of a length and velocity measurement apparatus in accordance with the present invention.

The present invention relates to a distance and velocity measurement apparatus, generally identified with the reference numeral 20, illustrated in block diagram form in FIG. 1. The distance and velocity apparatus 20 provides high spatial resolution (narrow optical beam width) with small antenna (lens) size and high length and velocity resolution, at a comparatively low cost. This makes the apparatus very suitable as a portable length and velocity measurement instrument. In accordance with the present invention, an interference pattern is created between a sample of the RF amplitude modulation signal and the detected RF signal from the back reflected optical signal from the target. Distance measurements are made by counting the periods in the interference pattern while the modulation frequency is swept from a frequency $F_1$ to a frequency $F_2$. In accordance with an important aspect of the invention, the apparatus 20 is mounted on a movable carriage which allows the periods in the interference Pattern to be adjusted to be an integral number to improve the resolution. Velocity measurement are made at a constant RF modulation frequency by measuring the number of periods per time interval in the inference pattern between a sample from the RF amplitude modulation signal and the RF signal detected from the amplitude modulation of the back reflected optical signal (Doppler effect).

Referring to FIG. 1, the distance and velocity measurement apparatus 20 is mounted on a carriage 22 that is movable in a horizontal direction, for example −5 to 5 cm as shown; typically a span not much more than one RF wavelength (3 cm at 10 GHz RF modulation frequency). The distance and velocity measurement apparatus 20 includes a transmitting/receiving aperture 24. It is also contemplated to use separate transmitting and receiving apertures (lenses), for example as in bi-static radar systems in order to increase the overall sensitivity of the system. The use of separate transmitting and receiving apertures provides 4× more optical power for equal aperture sizes relative to the configuration illustrated in FIG. 1. An optical duplexer 26 may be used for separating the transmitted and reflected signals. As shown in FIG. 1, a 3 dB fiberoptic directional coupler may be used. However, the principals of the present invention also contemplate use of an optical circulator for separating transmitted and reflected optical signals. However, such an optical circulator will reduce the system power by approximately 3 dB, but is contemplated to be twice as sensitive as the system illustrated in FIG. 1.

The distance and velocity measurement system 20 also includes a microwave subsystem 28 and a laser diode subsystem 30. The microwave subsystem 28 is a voltage controlled oscillator, including the necessary signal and system conditioning and control elements (i.e. amplifiers, bias regulation, temperature compensation, etc.). A VCO is a well known RF oscillator, the frequency of which can be varied by varying a control voltage, usually applied via a varactor diode circuit. These VCOs are available in many variations and levels of sophistication as standard RF/Microwave subsystems from many manufacturers. The RF output signal is modulated onto a highly spatially coherent optical signal. In particular, the RF output signal of the VCO is applied to the laser diode subsystem 30. The laser diode subsystem 30 consists out of a free running laser diode plus signal and system conditioning and control elements. Almost all fiber optic communications systems and many fiber optic sensor and control systems use such modulatable laser diodes. A well known manufacturer of such fiber optic laser communication transmit modules is the Ortel Corp. in Calif., USA. Applications requiring more optical power than laser diodes, a Mach-Zehnder modulator can be used. The modulated optical signal from the laser diode system 30 is directed through the optical duplexer 26 and out the transmitting aperture 24. The transmitted signal, identified with the arrow 32, is directed to a target, for example, a stationary target, generally identified with the reference numeral 34 at a distance d from the distance and velocity measurement apparatus 20. The target 34 is represented as a comer reflector 36 for receiving the transmitted signal from the distance and velocity measurement apparatus 20 and reflecting a reflected signal 38. The reflected signal 38 is received by the transmitting/receiving aperture 24 and optically separated from the transmitted signals by the optical duplexer 26. The reflected signal 38 is then applied to a light detection subsystem 40. The output signal 42 of the light detection system is the RF modulation component of the back reflected optical signal. Such light detection subsystems 40 or optical detection systems, basically consists of an optical detector, a RF input matching circuit and an amplifier for the detected signal; although some other components maybe included depending on the level of performance and sophistication. Typical off the shelf assemblies are available from the communications industry, like the previously mentioned Ortel Corp. The RF signal 42 is summed by means of a directional coupler, with a RF reference signal from the microwave subsystem 28. This RF sum signal is applied to a microwave detector subsystem 44. Such a microwave detector system consists of a microwave/RF detector, possible some bias circuitry for it, and usually an amplifier to boost the detected signal; all of which are well known. The micorwave dector sybsystem 44 demodulates (peak detects) the summed microwave signal 42 and applies reference signal is swept from a frequency $F_1$ to a second frequency $F_2$; the sweep need only be monotonic. A signal processor and control unit (not shown) are adapted to convert the output signal from the counter 48 to an appropriate value to be displayed on the display 46.

Figure 2:
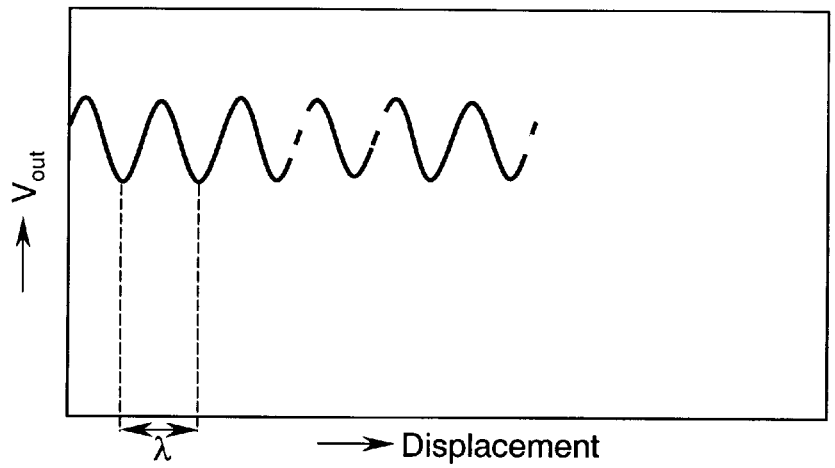
FIG. 2 is a graphical illustration of the output signal $V_{out}$ of the length and velocity measurement apparatus as a function of displacement.
Figure 3:
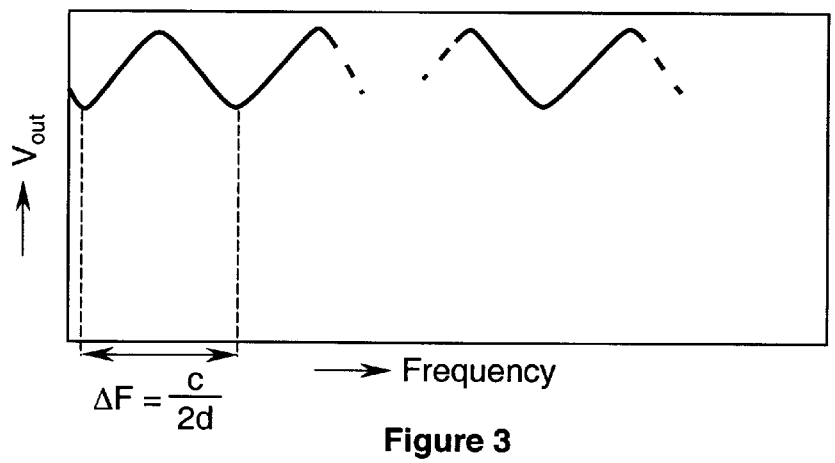
FIG. 3 is a graphical illustration similar to FIG. 2 illustrating the system output signal $V_{out}$ as a function of frequency.

For a constant microwave modulation frequency, the demodulated microwave signal $V_{out}$ as a function of carriage displacement is illustrated in FIG. 2. When the carriage 22 is stationary and the frequency of the microwave reference signal is varied monotonically, the output signal $V_{out}$ varies periodically with a period $\Delta F = c/2d$, where c=the speed of light in air and d is the distance from the transmitting aperture 24 to the target 34 plus some fixed internal transmission system dependant equivalent pathlength (cables, etc.) as shown in FIG. 3. An increase in frequency of the microwave reference signal by $\Delta F$ increases the fringe count by one. The fringe count is equal to the number of half wavelengths that fit into the distance d; the distance between the transmitting aperture 24 and the target 34. For example, if the microwave reference signal is varied monotonically and continuously (i.e. frequency swept from $F_1$ to $F_2$ in a time $t_{sw}$), the propagation tine to the target τ, assuming that d=an integral number of wavelengths $N_1$ and $N_2$ at frequencies $F_1$ and $F_2$, the number of cycles or periods of $V_{out}$ during the frequency sweep will equal ΔN which, in turn is equal to $N_2-N_1$, provided that the differential change in the phase at the transmitter over and above that which would occur if the frequency was constant over 2τ is small as illustrated in Equation 1:

$$\frac{1}{F}\frac{dF}{dt}2\tau \approx \frac{F_2-F_1}{F2\tau_{sw}}2\tau \ll 1 \qquad 1$$

The number of periods during the frequency sweep ΔN measured by the counter 48 can then be expressed as illustrated below in equations 2–5

$$d = N_1 \frac{\lambda_1}{2} \qquad 2$$

$$d = N_2 \frac{\lambda_2}{2} \qquad 3$$

$$\Delta N = N_2 - N_1 \qquad 4$$

$$d = \frac{\Delta N \lambda_2}{1-\frac{\lambda_2}{\lambda_1}} = \frac{\Delta N \lambda_1}{\frac{\lambda_1}{\lambda_2}-1} \qquad 5$$

Figure 4:
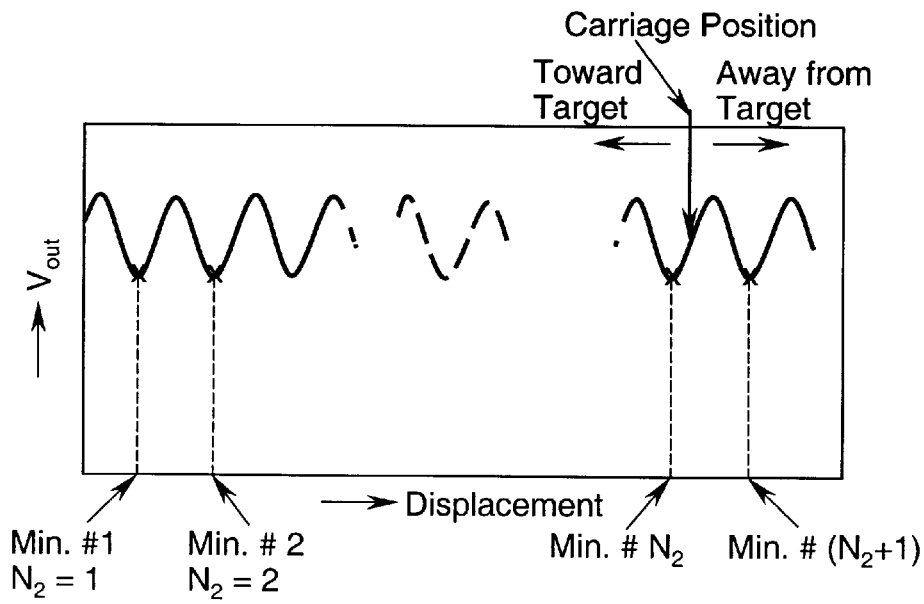
FIG. 4 is a graphical illustration of the output signal $V_{out}$ of the distance and velocity apparatus in accordance with the present invention as a function of displacement which illustrates the adjustment of the measurement apparatus in accordance with the present invention.

In reality d does not always equal an integral number of half wavelengths at either $F_1$ or $F_2$, thus providing a measurement error of±λ/2, which for an X-band microwave signal is about ±3 cm. For better resolution the frequency may first be set to $F_1$. The output signal $V_{out}$ from the detector 44 is then set at a minimum by moving the carrier 22 a distance of $\Delta d_1$ to d+$\Delta d_1$. The quantity $d_1+\Delta d_1$=an integral number $N_1$ of half wavelengths $\lambda_1$. A frequency sweep from frequency $F_1$ to $F_2$ is then performed. A count ΔN is made at the end of the sweep and the frequency is held at $F_2$ after which the carriage 22 is again moved to the minimum d+$\Delta d_2$. The quantity d+$\Delta d_2$ is equal to an integral number $N_2$ of half wavelengths $\lambda_2$. If the carriage was moved to the nearest minimum $N_2$, ΔN increases by one if the movement is away from the target while ΔN stays the same if the movement is towards the target, as illustrated in FIG. 4 as represented by equations 6 and 7 as illustrated below.

$$d = \frac{(\Delta N+b)\frac{\lambda_2}{2}}{1-\frac{\lambda_2}{\lambda_1}} + \frac{\frac{\lambda_2}{\lambda_1}\Delta d_1 - \Delta d_2}{1-\frac{\lambda_2}{\lambda_1}} \qquad 6$$

$$b = 0 \text{ or } 1$$

$$d = \frac{(\Delta N+b)\frac{\lambda_1}{2}}{\frac{\lambda_1}{\lambda_2}-1} + \frac{\Delta d_1 - \frac{\lambda_1}{\lambda_2}\Delta d_2}{\frac{\lambda_2}{\lambda_1}-1} \qquad 7$$

Velocity measurements are relatively easier than distance measurements with the present invention 20 since no frequency sweep is required nor movement of the carriage 22. The velocity measurements are based on the Doppler effect and in particular, the phase change with time of the phase of the reflected signal. The system may utilize either a count window or a coupled timer, like a police radar speed gun, and have a fixed time window (i.e. fixed shutter speed with a manual trigger activation.) In an embodiment using a count window, the count window may be set for example at 10. In this example, as the 10 count time is recorded, the quantity $10 \times (\lambda_2)$/time is the target speed ±a fraction of one count depending on the timer accuracy. In this case a fraction of 10% accuracy for the average speed of the target is taken over the time window. In an embodiment which uses a time window, the time window is fixed and the count error is ±1. For example, for a laser speed gun clocking 5 mph (approximately 2 meters/second) with an RF modulated frequency of 10 GHz ($\lambda$=3 cm). The count is 2/0.015 or approximately 1.33 per second. For a shutter speed of 0.1 second, the accuracy is one in 13.3 or about 7.75% at about 5 mph and about 0.75% at 50 mph.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A measurement apparatus for measuring the distance of a target, the measurement apparatus comprising:

means for generating an optical signal;
   means for modulating said optical signal with an RF microwave signal defining a modulated optical signal;
   means for generating an RF microwave signal having a first frequency $F_1$;
   means for transmitting said modulated optical signal to a target of interest by way of a first aperture and receiving reflected optical signals from said target of interest by way of a second aperture;
   means for demodulating the RF microwave signal from said modulated optical signal reflected from said target defining a detected RF signal;
   means for summing said detected RF signal with an RF reference signal to generate an RF sum signal;
   means for demodulating said RF sum signal defining a demodulated sum signal;
   means for sweeping the frequency of said generating means from said first frequency $F_1$ to a second frequency $F_2$;
   means for counting the periods in said demodulated sum signal while said frequency is varied from $F_1$ to $F_2$; and
   a movable carriage for carrying said measurement apparatus and enabling the distance between said measurement apparatus and said target of interest to be adjusted toward and away from the target as a function of the periods of said RF sum signal; the movable carriage adapted to being maintained in a stationary position after adjustment and during a measurement.

2. The measurement apparatus as recited in claim 1, wherein said modulating means includes a laser diode.

3. The measurement apparatus as recited in claim 1, wherein said transmitting and receiving means includes a single aperture and an optical duplexer.

4. The measurement apparatus as recited in claim 1, wherein said detecting means includes a microwave detector.

5. The measurement apparatus as recited in claim 1, wherein said counting means includes a counter.

6. The measurement apparatus as recited in claim 1, further including a display and means for displaying the distance of the target relative to the measurement apparatus.

7. The measurement apparatus as recited in claim 1, wherein said transmitting and receiving means includes a single optical aperture and an optical duplexer for separating said transmitted and reflected optical signals.

8. The measurement apparatus as recited in claim 1, wherein said modulating means includes a laser diode.

9. The measurement apparatus as recited in claim 1, wherein said modulating means includes a Mark Zehnder modulator.

10. A measurement apparatus for measuring the distance to and velocity of a target, the measurement apparatus comprising:

means for generating an optical signal;
   means for modulating said optical signal with an RF microwave signal;
   means for generating an RF microwave signal having a first frequency $F_1$;
   means for transmitting said modulated optical signal to a target of interest and receiving reflected optical signals from said target of interest;
   means for detecting the RF signal in said optical signal reflected from said target defining a detected RF signal;
   means for summing said detected RF signal with an RF reference signal to generate an RF sum signal;
   means for demodulating said RF sum signal defining a demodulated sum signal;
   means for sweeping the frequency of said generating means from said first frequency $F_1$ to a second frequency $F_2$;
   means for counting the periods of said demodulated signal while said frequency is varied from $F_1$ to $F_2$;
   means for measuring the velocity of said desired targets, wherein the velocity of said desired target is determined as a function of a predetermined number of periods of said demodulated sum signal while said frequency is maintained constant; and
   a movable carriage for carrying said measurement apparatus and enabling the distance between said measurement apparatus and said target to be adjusted toward and away from the target as a function of the periods of said RF sum signal; the movable carriage adapted to being maintained in a stationary position after adjustment and during a measurement.

11. A measurement apparatus for measuring the distance of a target, the measurement apparatus comprising:

a microwave subsystem for generating a frequency swept microwave signal;
   an optical subsystem for modulating said frequency swept microwave signal onto an optical signal defining a transmitted optical signal;
   means for transmitting and receiving transmitted optical signals and reflected optical signals;
   a light detection subsystem for converting said reflected optical signals to an RF signal;
   a microwave detector subsystem for demodulating said RF signal defining an output signal;
   means for measuring the periods of said output signal while the frequency of said microwave reference signal is varied from a frequency $F_1$ to a frequency $F_2$; and
   a movable carriage for adjusting the distance between said measurement apparatus relative to said target to be adjusted away and toward the target as a function of the periods of said RF sum signal; the movable carriage adapted to being maintained in a stationary position after adjustment and during measurement.

12. The measurement apparatus as recited in claim 11, wherein said transmitting and receiving means includes a single optical aperture and an optical duplexer for separating said transmitted and reflected optical signals.

13. A measurement apparatus for measuring the velocity of and distance to a target, the measurement apparatus comprising:

- a microwave subsystem for generating a frequency swept microwave signal;
- an optical subsystem for modulating said frequency swept microwave signal onto an optical signal defining a transmitted optical signal;
- means for transmitting transmitted optical signals and receiving reflected optical signals;
- a light detection subsystem for converting said reflected optical signals to RF signals;
- a microwave detector subsystem for demodulating said RF signals defining an output signal;
- means for measuring periods of said output signal while the frequency of said microwave reference signal is varied from a frequency $F_1$ to a frequency $F_2$;
- means for measuring the velocity of said target, wherein the velocity of said target is determined as a function of a predetermined number of periods of said output signals while the frequency of said microwave reference signal is maintained constant; and
- a movable carriage for carrying said measurement apparatus and enabling the distance between said measurement apparatus and said target to be adjusted toward and away from the target as a function of the periods of said RF sum signal; the movable carriage adapted to being maintained in a stationary position after adjustment and during a measurement.

* * * * *